United States Patent
Erhart et al.

(10) Patent No.: US 7,610,055 B2
(45) Date of Patent: Oct. 27, 2009

(54) SYNCHRONIZING INFORMATION ACROSS TELECOMMUNICATIONS TERMINALS FOR MULTIPLE USERS

(75) Inventors: George William Erhart, Pataskala, OH (US); Valentine C. Matula, Granville, OH (US); Emily E. Matula, Granville, OH (US); David Joseph Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 970 days.

(21) Appl. No.: 11/128,990

(22) Filed: May 13, 2005

(65) Prior Publication Data

US 2006/0256734 A1 Nov. 16, 2006

(51) Int. Cl.
*H04M 1/00* (2006.01)
*H04M 7/00* (2006.01)

(52) U.S. Cl. .................. 455/463; 456/502; 456/550.1

(58) Field of Classification Search ............ 379/100.03, 379/130, 188, 201.02, 201.05, 201.12; 455/414.1, 455/418, 435.1, 463, 502, 518, 550.1
See application file for complete search history.

(56) References Cited

U.S. PATENT DOCUMENTS 6,867,733 B2 * 3/2005 Sandhu et al. ......... 342/357.07
6,874,037 B1 3/2005 Abram et al.
7,415,486 B2 * 8/2008 Multer ....................... 707/201

(Continued)

FOREIGN PATENT DOCUMENTS

GB 2315954 A 2/1998

(Continued)

OTHER PUBLICATIONS

Lochel, "DE Application No. 10 2006 020 059.4-31 Office Action", Jan. 21, 2009, Published in: de.

*Primary Examiner*—Binh K Tieu
(74) *Attorney, Agent, or Firm*—DeMont & Breyer, LLC

(57) ABSTRACT

A method and apparatus are disclosed that enable the synchronization of user profile information for M users who are sharing K telecommunications terminals, wherein M and K are not necessarily equal to each other. The disclosed technique addresses the problem that occurs when multiple users share multiple terminals, in which a user that selects a particular terminal to use has to contend with the contact lists, user preferences, and call log entries that are left over from the previous user or users of the selected terminal. In accordance with the illustrative embodiment of the present invention, the user profile information is associated with and stored for each user in a group of users, in contrast to being associated with and stored for the telecommunications terminal. The user profile information comprises (i) contact information, (ii) call or message activity, and (iii) user terminal preferences.

23 Claims, 9 Drawing Sheets

U.S. PATENT DOCUMENTS

| | | |
|---|---|---|
| 2002/0087625 A1 | 7/2002 | Toll et al. |
| 2003/0004934 A1 | 1/2003 | Qian |
| 2003/0022664 A1 | 1/2003 | Goldstein |
| 2004/0048605 A1* | 3/2004 | Schaefer et al. .......... 455/414.2 |
| 2004/0058710 A1* | 3/2004 | Timmins et al. ............ 455/560 |
| 2004/0136404 A1* | 7/2004 | Mahonen et al. ........... 370/503 |
| 2004/0142711 A1 | 7/2004 | Mahonen et al. |
| 2005/0193054 A1* | 9/2005 | Wilson et al. ............... 709/200 |
| 2005/0202817 A1* | 9/2005 | Sudit ......................... 455/433 |
| 2006/0080415 A1 | 4/2006 | Tu |
| 2006/0099945 A1* | 5/2006 | Helvick ................... 455/432.3 |
| 2006/0120518 A1* | 6/2006 | Baudino et al. .......... 379/91.02 |
| 2006/0123080 A1* | 6/2006 | Baudino et al. ............. 709/204 |
| 2006/0179410 A1* | 8/2006 | Deeds ........................ 715/750 |

FOREIGN PATENT DOCUMENTS

| | | |
|---|---|---|
| WO | 99/44380 | 9/1999 |
| WO | 2006/062693 A2 | 6/2006 |

\* cited by examiner

| Calling Party | Number | Time/Date | Duration |
|---|---|---|---|
| Barb Smith | 732-555-9872 | 01:15pm; 04/22/05 | 01:03:04 |
| Sam Perez | 609-555-0923 | 12:44pm; 04/22/05 | 00:00:12 |
| ... | ... | ... | ... |
| John Doe | 212-555-0964 | 07:32am; 10/23/04 | 00:38:52 |

(b)
602

| Called Party | Number | Time/Date | Duration |
|---|---|---|---|
| John Doe | 212-555-0964 | 01:07pm; 04/22/05 | 00:03:04 |
| Susan Jones | 603-555-1123 | 08:49am; 04/22/05 | 00:59:12 |
| ... | ... | ... | ... |
| Linda Giordano | 415-555-9378 | 09:23am; 10/23/04 | 01:31:32 |

(c)
603

| Calling Party | Number | Time/Date | Call Treatment |
|---|---|---|---|
| Liz Brown | 732-555-6544 | 01:16pm; 04/22/05 | Voice Mail |
| Liz Brown | 732-555-6544 | 11:54am; 04/22/05 | Forwarded |
| ... | ... | ... | ... |
| Susan Jones | 603-555-1123 | 10:17am; 10/23/04 | Voice Mail |

SYNCHRONIZING INFORMATION ACROSS TELECOMMUNICATIONS TERMINALS FOR MULTIPLE USERS

FIELD OF THE INVENTION

The present invention relates to telecommunications in general, and, more particularly, to synchronizing information for multiple users across multiple telecommunications terminals.

BACKGROUND OF THE INVENTION

FIG. 1 depicts telecommunications system 100 in the prior art. Telecommunications system 100 comprises: telecommunications terminals 101-1 through 101-H, wherein H is a positive integer, and server 102, interrelated as shown. Users 103-1 through 103-H are associated with and use telecommunications terminals 101-1 through 101-H, respectively.

Telecommunications terminals 101-1 through 101-H are devices that are capable of communicating with other telecommunications terminals within or external to telecommunications system 100. Examples of such devices are a cellular telephone, an Internet-protocol (IP) deskset, a Session-initiation protocol (SIP) deskset, a personal digital assistant (PDA), a personal computer, and so forth. Also, terminals 101-1 through 101-H can be different from one another. For example, terminal 101-1 can be a cellular telephone, terminal 102-2 can be a laptop, terminal 102-3 can be a personal digital assistant, and so forth, wherein at least some of the terminals communicate user traffic (e.g., voice calls, emails, instant messages, etc.) with other terminals.

At least some of terminals 101-1 through 101-H are each capable of storing a call log of the calls (or messages) that are: (i) received by the terminal and answered by its user, (ii) originated at the terminal, and (iii) received by the terminal, but missed by its user. Also, at least some of terminals 101-1 through 101-H are also capable of being configured according to their users' preferences. For example, terminal 101-1 can be configured to play various sounds (e.g., ringtones, etc.) that are selected by its user and according to the particular alerting desired for the type of incoming call (or message). Terminal 101-1, as another example, can illuminate its display in different colors or background images based on certain conditions being met that are specified by its user.

In addition to enabling their users to communicate with each other, at least some of terminals 101-1 through 101-H can synchronize with each other some of the data that is stored in each terminal. The synchronization of data across devices is a well-known concept. In general, synchronization takes place between a terminal device and a server device, such as server 102. Server 102 can be an application in a local personal computer or a dedicated synchronization server. Furthermore, some of the data that are stored in the terminals can be synchronized with network applications or desktop computer applications. In particular, data that are related to appointment calendars, address books, to-do lists, and email applications are typically synchronized across devices.

Although synchronization has been based on the use of different manufacturer-specific protocols, where many of which are incompatible with each other, synchronization is becoming increasingly based on a language known and referred to as synchronization markup language (or "SyncML"). SyncML is based on the extensible markup language (XML). The SyncML synchronization protocol works both in wireless and in wired networks, and supports several transmission protocols. By using a SyncML synchronization protocol, which employs messages that are in the SyncML format, data of various applications can be synchronized between networked terminals and network servers of various kinds.

SUMMARY OF THE INVENTION

The problem with using multiple telecommunications terminals is that when multiple users share multiple terminals, such as in a pooled phone arrangement, a user that selects a particular terminal to use has to contend with the contact lists, user preferences, and call log entries that are left over from the previous user or users of the selected terminal. Moreover, if the same user previously used another terminal, he would not have access to some or all of his user-specific information on the new terminal. For example, if a first user participates in a series of calls on a first terminal and, later on, starts using a second terminal, he will not be guaranteed access to his call log that he left behind on the first terminal. Meanwhile, if a second user starts using the first terminal, she will see the call log of the calls that were made on the first terminal by the first user. In addition, the second user will also have to contend with the personalized user settings (i.e., the user preferences) that are left over from the first user.

The present invention enables the synchronization of user profile information for M users who are sharing K telecommunications terminals, wherein M and K are not necessarily equal to each other. The user profile information comprises one or more of (i) contact information, (ii) call or message activity (as call log entries), and (iii) user preferences, such as alerting preferences. In accordance with the illustrative embodiment of the present invention, the information that is part of the user profile is associated with and stored for each user in a group of users, in contrast to being associated with and stored for the telecommunications terminal.

Each telecommunications terminal is provisioned with a list of the terminals and users in a device/user group of which the terminal is a member. Each terminal stores a current copy of the user profile for each user in the group, wherein the user profile is applied to the user's session on the terminal when the user logs in. Furthermore, whenever a user logs into any terminal in the device/user group, changes that are made to the user profile during the login session are sent peer-to-peer from the terminal to other terminals that are members of the device/user group. For example, when the logged-in user makes a call, the outgoing call is recorded on the user's call log (instead of or in addition to the terminal's call log), and the change to the call log is transmitted to the other terminals in the device/user group. If a receiving terminal is unable to receive the changes, such as when it is powered off or out of communications range, the sending terminal can: (i) attempt to transmit the changes later, (ii) propagate the changes through an intermediary terminal or terminals, or (iii) transmit the changes to a server that will store-and-forward the changes at a later time.

By enabling the synchronization of contact information, call log entries, and user preferences on a per-user basis, the illustrative embodiment of the present invention enhances the user's call-handling experience. When a user selects and starts using a telecommunications terminal within a pool of terminals, the user has all of his or her user profile information enabled on the selected terminal. Furthermore, the user is able to have timely access to call activity information from another terminal that the user previously used or to changes in user preferences that the user made elsewhere. When a first user logs into a terminal, he sees that the terminal is already personalized to the extent that it contains information, both call-independent and call-dependent, that is specific to him. Later on, when a second user logs into the same terminal, she also sees that the terminal is already personalized to the extent that it contains information, both call-independent and call-dependent, that is specific to her. In essence, each user's personal workspace, which is represented by the user's profile information, is replicated across the telecommunications terminals.

The illustrative embodiment of the present invention comprises: a receiver for receiving, from a second telecommunications terminal, a first portion of a first user profile that is associated with a first user, wherein the first portion comprises a first call log entry that is associated with the first user; a memory for storing, at the first telecommunications terminal: (i) the first portion as part of the first user profile, and (ii) a second user profile that is associated with a second user; and a transmitter for transmitting a second portion of the second user profile.

BRIEF DESCRIPTION OF THE DRAWINGS

FIG. 6 depicts an example of an illustrative user profile segment that represents the call log of a particular user, in accordance with the illustrative embodiment of the present invention.

DETAILED DESCRIPTION

Figure 1:
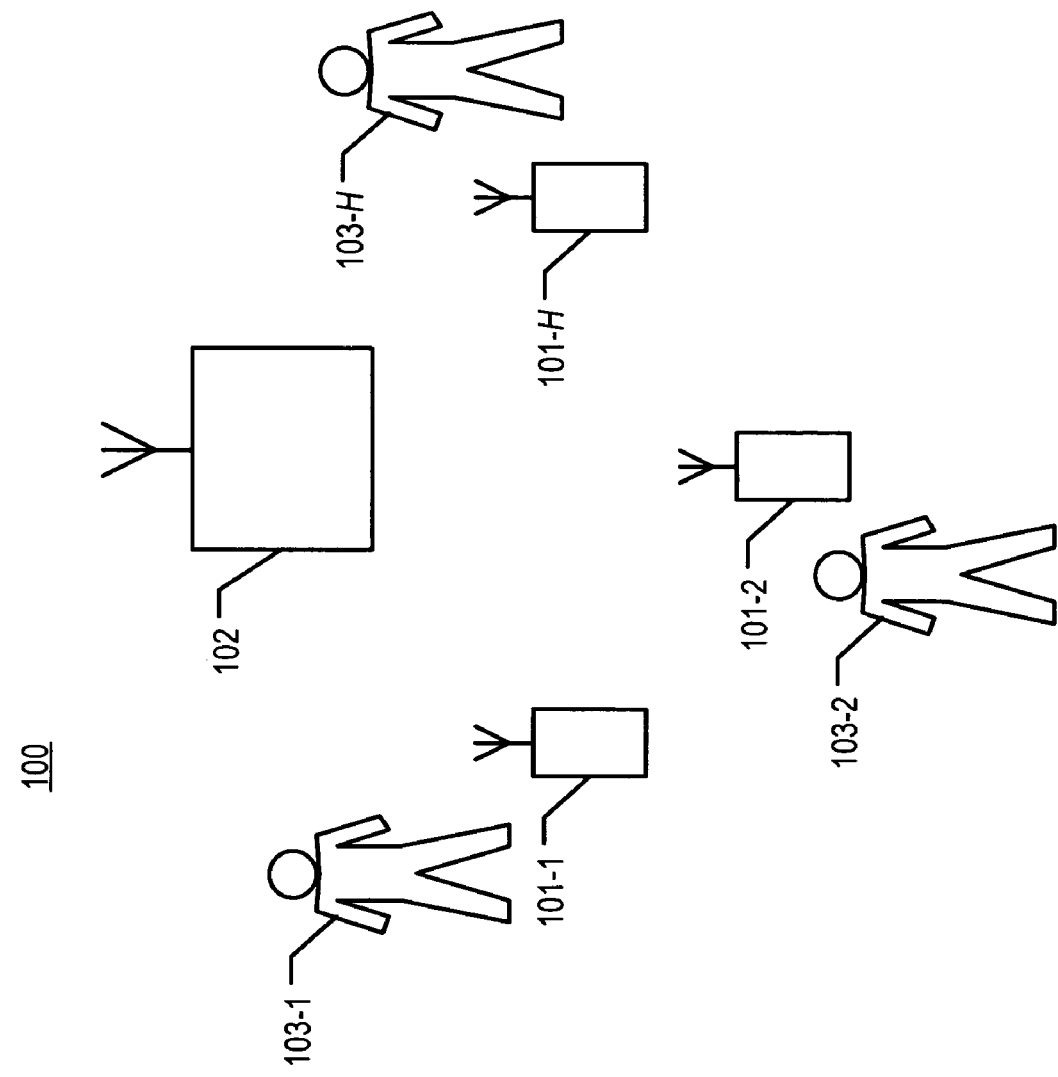
FIG. 1 depicts telecommunications system 100 in the prior art.
Figure 2:
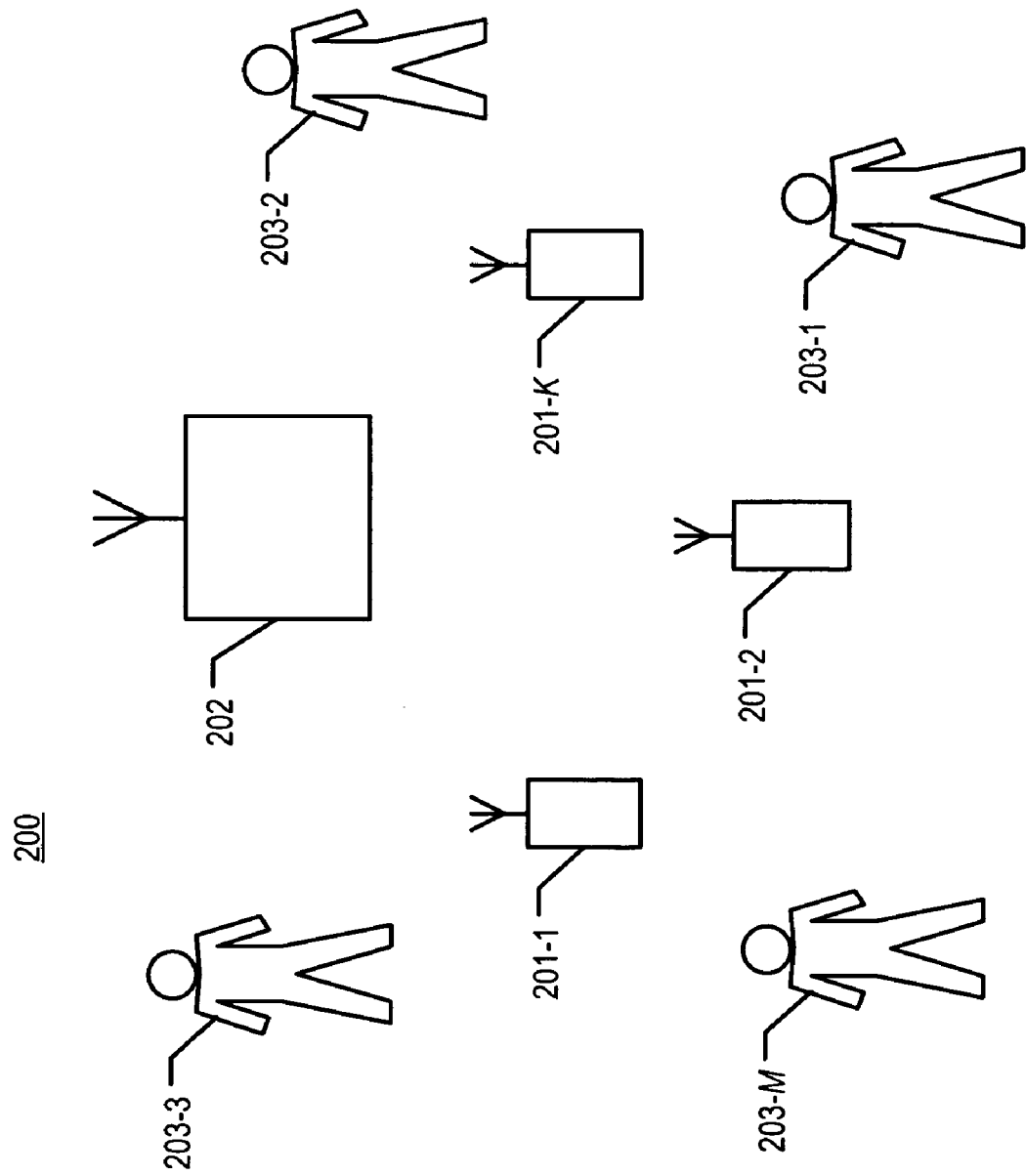
FIG. 2 depicts telecommunications system 200 in accordance with the illustrative embodiment of the present invention.

FIG. 2 depicts telecommunications system 200 in accordance with the illustrative embodiment of the present invention. Telecommunications system 200 comprises: telecommunications terminals 201-1 through 201-K, wherein K is a positive integer, and server 202, interrelated as shown. Users 203-1 through 203-M, wherein M is a positive integer, use telecommunications terminals 201-1 through 201-K.

Three terminals and four users are depicted in FIG. 2. It will be clear, however, to those who are skilled in the art, after reading this disclosure, how to make and use telecommunications system 200 so that the numbers of terminals and users are different than those shown in FIG. 2. In other words, the value for K can be different than three and the value for M can be different than four. Furthermore, the value for K can be greater than, equal to, or less than the value for M.

Telecommunications terminal 201-k, where k is between 1 and K, is a device that is capable of communicating, in well-known fashion, with other telecommunications terminals that are within or external to telecommunications system 200. In accordance with the illustrative embodiment of the present invention, telecommunications terminal 201-k is a cellular telephone that is capable of originating and receiving (i.e., "terminating") telecommunications calls across a user-traffic communications channel in well-known fashion. Terminal 201-k is also capable of performing all of the tasks described below and with respect to FIGS. 7 through 9. The salient components of terminal 201-k are described below and with respect to FIG. 3. It will be clear to those skilled in the art, after reading this disclosure, how to make and use terminal 201-k.

In accordance with the illustrative embodiment of the present invention, terminals 201-1 through 201-K exchange user profile information with each other. User profiles are described below and with respect to FIGS. 4 and 5. Terminals 201-1 through 201-K exchange user profile information directly with each other across a synchronization communications channel and in accordance with the Wi-Fi protocol, where "Wi-Fi" is short for "wireless fidelity" and is associated with the family of protocols known as Institute of Electrical and Electronics Engineers (IEEE) 802.11. It will, however, be clear to those skilled in the art, after reading this disclosure, how to make and use alternative embodiments with terminals that exchange user profile information directly with each other in accordance with other protocols (e.g., Bluetooth, etc.). Furthermore, it will be clear to those skilled in the art, after reading this disclosure, how to make and use embodiments of the present invention with terminals that exchange user profile information through the same wireless infrastructure, such as GSM or 3G UMTS, that is used to carry voice and other user-related traffic between the users of terminals 201-1 through 201-K across the user-traffic communications channel.

Terminals 201-1 through 201-K, in accordance with the illustrative embodiment, use the SyncML protocol, as is known in the art, to synchronize the multiple user profiles across terminals. As those who are skilled in the art will appreciate, other protocols can be used communicate peer-to-peer for the purpose of synchronizing the user profiles. Session-initiation protocol (SIP) is an example of such a protocol.

In some alternative embodiments, some of terminals 201-1 through 201-K are telecommunications devices other than a cellular telephone. Examples of other telecommunications devices include, but are not limited to, an Internet-protocol (IP) deskset, a Session-initiation protocol (SIP) deskset, a personal digital assistant (PDA), a personal computer, and so forth. For example, a first terminal might be a cellular telephone, a second terminal might be a laptop, a third terminal might be a personal digital assistant, and so forth. In those embodiments, some or all of terminals 201-1 through 201-K are terminals with wired connections to a telecommunications network for the purpose of communicating with other terminals, while some terminals might still be wireless (i.e., cellular or otherwise).

Server 202 is a store-and-forward device that is capable of exchanging information with one or more terminals 201. For example, server 202 might be an access point, as is known in the art. In some embodiments of the present invention, server 202 might be used to receive user profile information from a first terminal, such as terminal 201-1, and to forward the user profile information to a second terminal, such as terminal 201-2. When the second terminal is unavailable, server 202 is able to store the user profile information, along with forwarding instructions from the first terminal, until the second terminal becomes available. It will be clear to those skilled in the art how to make and use server 202.

User 203-m, where m is between 1 and M, uses one or more of terminals 201-1 through 201-K in order to communicate with other terminals or users. User 203-m, also referred to as "user $U_m$", has an associated user profile. The user profile of user $U_m$ comprises data associated with user $U_m$ that includes, but is not limited to:

i. user $U_m$'s identification,
    ii. user $U_m$'s contact list,
    iii. user $U_m$'s appointment calendar,
    iv. user $U_m$'s to-do list,
    v. the call/message activity of user $U_m$, and
    vi. the user preferences of user $U_m$.

The user profile is described below and with respect to FIGS. 4 and 5.

Terminals 201-1 through 201-K and users $U_1$ through $U_M$ are part of a device/user group, in which multiple terminals and users are associated with each other. Device/user groups are described in detail below and with respect to FIG. 4. For example, terminals 201-1 through 201-K and users $U_1$ through $U_M$ might be part of a work-related group or a family-related group. As those who are skilled in the art will appreciate, however, some of terminals 201-1 through 201-K might or might not be part of the same pre-existing service plan (e.g., a cellular service provider's family plan, etc.).

As members in a device/user group, terminals 201-1 through 201-K and users $U_1$ through $U_M$ are associated with each other without there being a fixed, one-to-one correspondence between a terminal and a user in the group. For example, although user $U_1$ might on occasion use terminal 201-1, user $U_1$ might also use terminal 201-3 and user $U_4$ might use terminal 201-1. In other words, terminals 201-1 through 201-K are available to one or more users $U_1$ through $U_M$.

In accordance with the illustrative embodiment of the present invention, a user identifies himself or herself to a terminal by initially logging into the terminal. The terminal authenticates the user by verifying a user-entered password or personal identification number against the user name that the user logged in with. As those who are skilled in the art will appreciate, a variety of other methods exist that enable user identification. For example, in some alternative embodiments a user can self-identify to a terminal by inserting a personalized subscriber identity module (SIM) card into a memory slot of the terminal. In some other alternative embodiments, a user can self-identify by speaking into the microphone of a terminal that is capable of speech verification.

Figure 3:
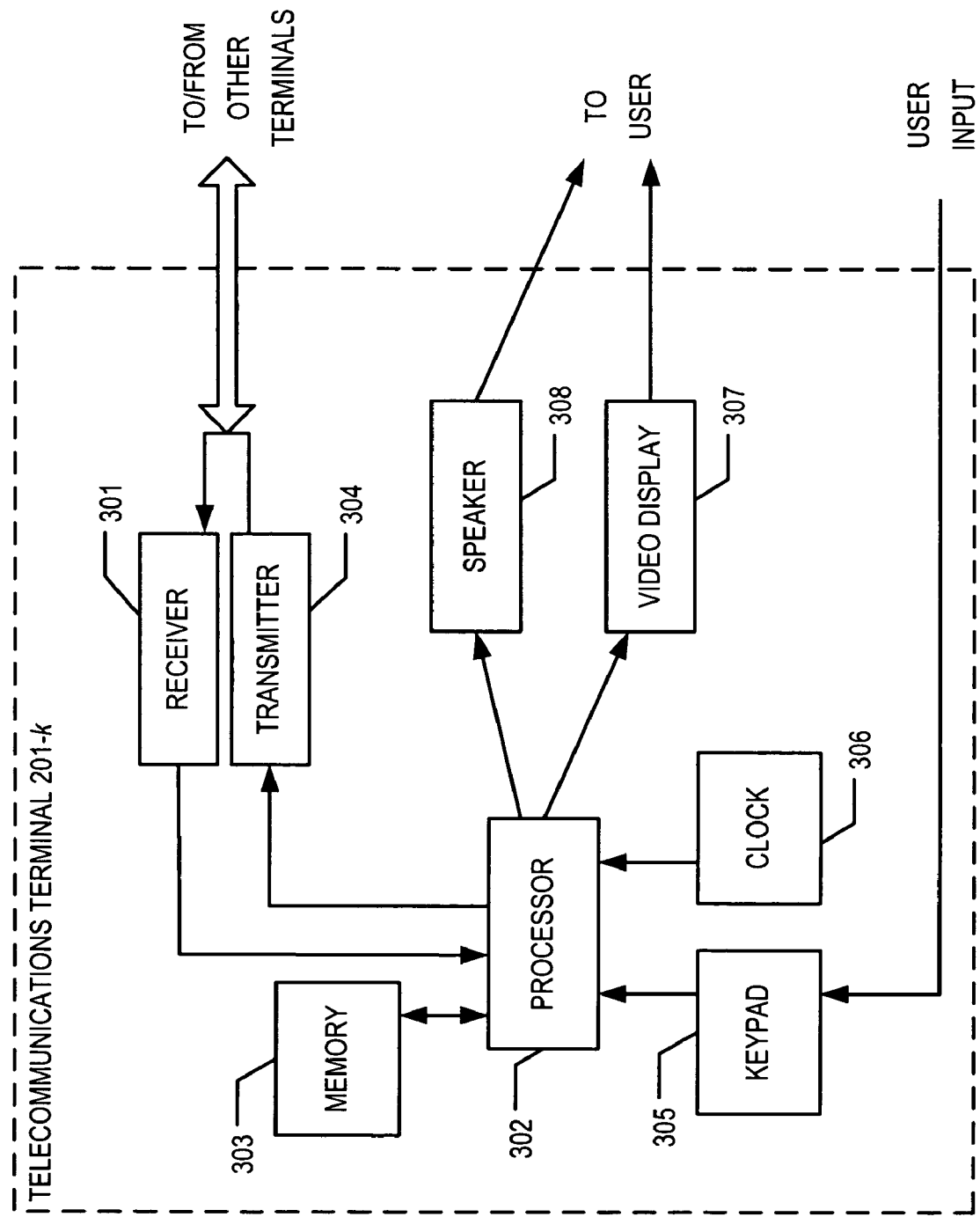
FIG. 3 depicts a block diagram of the salient components of telecommunications terminal 201-k, in accordance with the illustrative embodiment of the present invention.

FIG. 3 depicts a block diagram of the salient components of telecommunications terminal 201-k, in accordance with the illustrative embodiment of the present invention. Telecommunications terminal 201-k comprises: receiver 301, processor 302, memory 303, transmitter 304, keypad 305, clock 306, video display 307, and speaker 308, interconnected as shown.

Receiver 301 receives signals from other terminals 201, server 202, and network infrastructure outside of telecommunications system 200, and forwards the information encoded in the signals to processor 302, in well-known fashion. In accordance with the illustrative embodiment, receiver 301 enables two wireless, physical layer interfaces: (i) the interface for communicating voice and other user-related data via the user-traffic communications channel as part of a call and (ii) the interface for exchanging user profile information with other terminals via the synchronization channel. It will be clear to those skilled in the art, after reading this disclosure, how to make and use transceiver 301.

Processor 302 is a general-purpose processor that is capable of: receiving information from receiver 301 and keypad 305; reading data from and writing data into memory 303; executing the tasks described below and with respect to FIGS. 7 through 9; and transmitting information to transmitter 304, video display 307, and speaker 308. In some alternative embodiments of the present invention, processor 302 might be a special-purpose processor. In either case, it will be clear to those skilled in the art, after reading this disclosure, how to make and use processor 302.

Memory 303 is a non-volatile random-access memory that stores the instructions and data used by processor 302. Memory 303 stores the data that is described below and with respect to FIGS. 4 through 6. It will be clear to those skilled in the art, after reading this disclosure, how to make and use memory 303.

Transmitter 304 receives information from processor 302, and outputs signals that encode this information to other terminals 201, server 202, and network infrastructure external to telecommunications system 200, in well-known fashion. In accordance with the illustrative embodiment, transmitter 304 enables the same wireless, physical layer interfaces that receiver 301 enables. It will be clear to those skilled in the art, after reading this disclosure, how to make and use transmitter 304.

Keypad 305 is a character and user-selection input device as is well-known in the art that receives input from a user and transmits keypad signals representing that input. It will be clear to those skilled in the art how to make and use keypad 305.

Clock 306 maintains and distributes time and date information. It will be clear to those skilled in the art how to make and use clock 306.

Video display 307 is a display output device as is well-known in the art that receives a video signal and creates a visual image of the signal for a user. It will be clear to those skilled in the art how to make and use video display 307.

Speaker 308 is an acoustic output device as is well-known in the art that receives an audio signal and creates an audible representation of the signal for a user. It will be clear to those skilled in the art how to make and use speaker 308.

Figure 4:
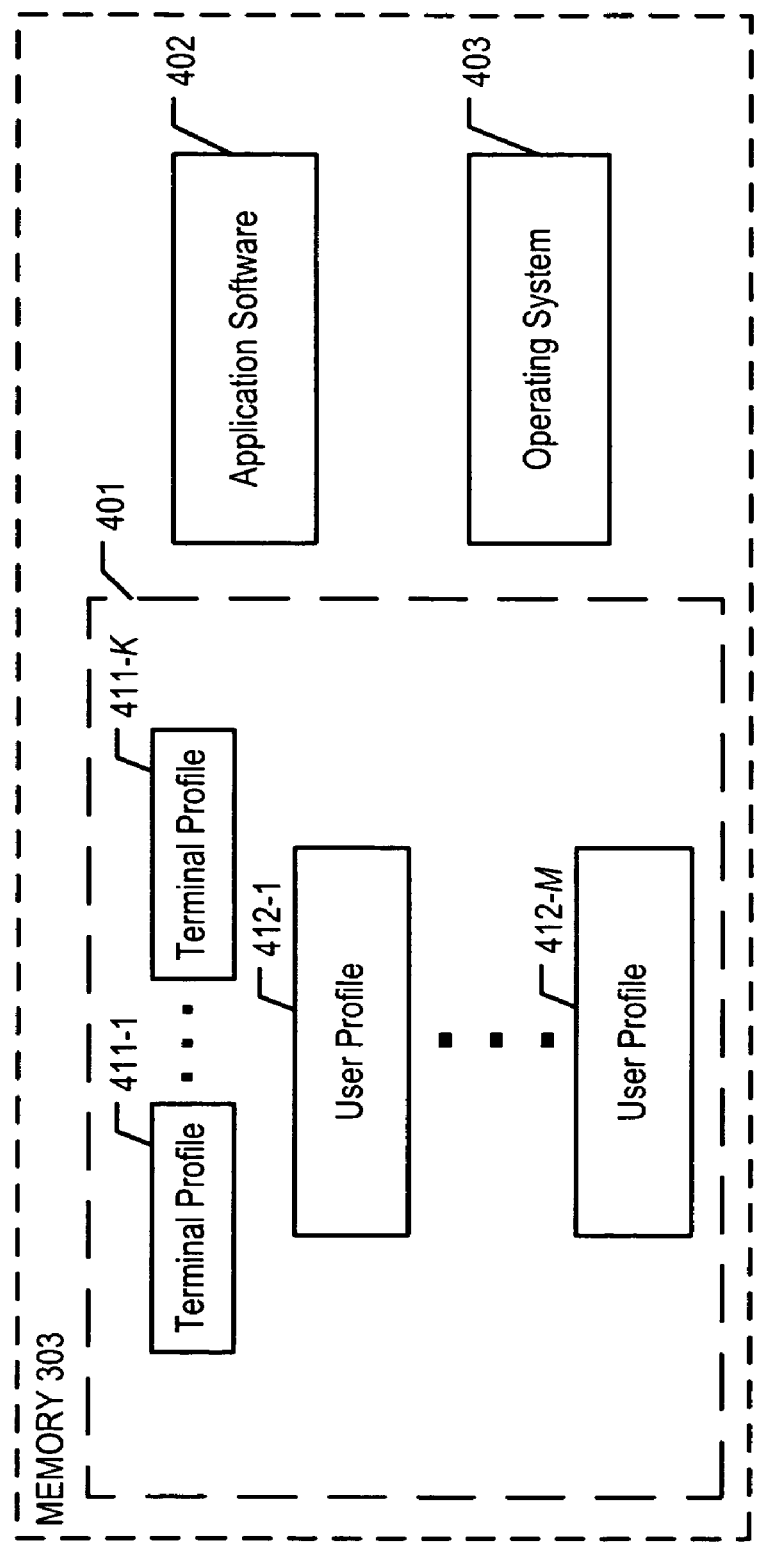
FIG. 4 depicts a block diagram of how information is stored and organized in memory 303 of terminal 201-k, in accordance with the illustrative embodiment of the present invention.

FIG. 4 depicts a block diagram of how information is stored and organized in memory 303 of terminal 201-k, in accordance with the illustrative embodiment of the present invention. The information stored in memory 303 comprises: device/user group 401; application software 402; and operating system 403. In turn, device/user group 401 comprises terminal profiles 411-1 through 411-K and user profiles 412-1 through 412-M. As will be appreciated by those skilled in the art, the information that is stored in memory 303 can be organized differently than what is depicted in FIG. 4.

Terminal profile 411-k is a file structure that comprises terminal-specific information about terminal 201-k such as the electronic serial number, software or firmware version number, and so forth. In accordance with the illustrative embodiment, terminal profile 411-k further comprises the terminal identifier, which is the address that is used to identify terminal 201-k to the network. In some alternative embodiments of the present invention, the terminal identifier is instead part of each user's profile.

User profile 412-m is a file structure that comprises user-specific information about user $U_m$. User profile 412-m is described below and with respect to FIG. 5.

Application software 402 is the software portion of the system described below and with respect to FIGS. 7 through 9. Operating system 403 is an operating system that performs input/output, file and memory management, and all of the other functions normally associated with operating systems, in well-known fashion. It will be clear to those skilled in the art how to make and use operating system 403.

Figure 5:
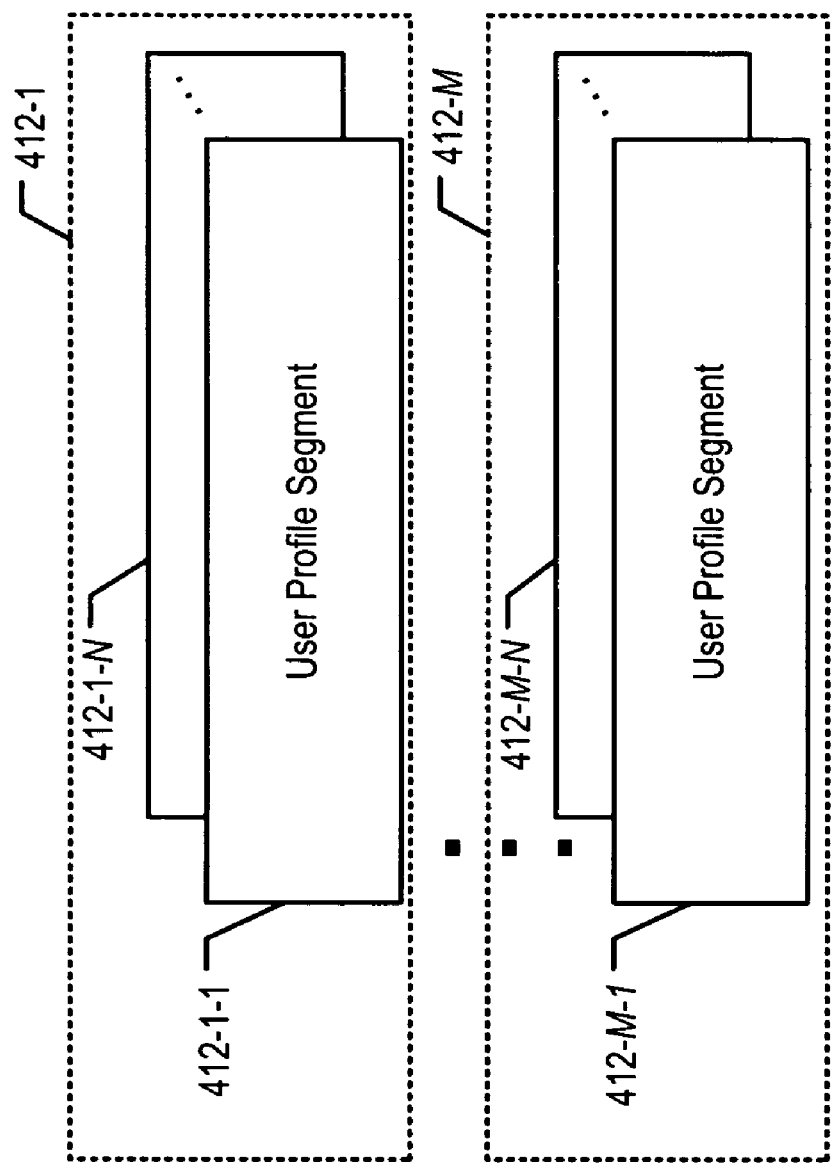
FIG. 5 depicts a block diagram of the user profile segments that constitute user profile 412-m.

FIG. 5 depicts a block diagram of the user profile segments that constitute user profile 412-m. As will be appreciated by those skilled in the art, the information that is stored for each user profile 412-m can be organized differently than what is depicted in FIG. 5. User profile 412-m, wherein m is a value between 1 and M, is further segmented into user profile segments 412-m-n, wherein n=1 through N and N is a positive integer. Each user profile segment 412-m-n is a file structure that comprises information for a particular data group (of N data groups) in user $U_m$'s profile. For example, segment 412-1-3 might comprise information that represents a contact list for user $U_1$, while segment 412-3-2 comprises information that represents a call log associated with user $U_3$.

A first segment within user $U_m$'s profile stores a contact list. User $U_m$'s contact list segment comprises entries for each contact such as, but not limited to: contact name, title, address, phone number(s), speed dial information, email address, and notes. The contact list is also known as an "address book" or "phone book."

A second segment within user $U_m$'s profile stores user preferences. User $U_m$'s user preferences define how the telecommunications terminal that user $U_m$ is currently logged into is to behave. User $U_m$'s user preferences segment comprises attributes such as, but not limited to:

i. sound settings, including alert sounds and modes (such as ringtone volumes and privacy/vibrate-only alert modes), keypad sounds, power on/off sounds, etc.;
ii. display settings, including backlight, banner, alert colors, display brightness, display character set, etc.;
iii. feature settings, including one-touch dialing, answer call mode, auto-answer option, language, etc.;
iv. data and text message settings, including stored messages, downloaded video clips, "personal shopping" wallet contents, web browsing history and cookies, see-you-see-me video settings, etc.;
v. game settings, including downloaded games, state of game last used, etc.;
vi. camera settings, including pictures and video taken by camera, image capture modes, etc.;
vii. voice services settings;
viii. location-based service settings, including setting of geo-location privacy mode, etc.; and
ix. synchronization settings, including indications of which user profile information is to be synchronized across terminals or which user profile information is to be excluded from synchronizing across terminals.

Note that at least some of the settings govern a telecommunications terminal's behavior when using the user-traffic communications channel (e.g., to send or receive calls, etc.).

Information that allows for compatibility across terminals is also part of the user preferences segment. For example, the user preference for volume might be stored relative to a ten-level scale, but a particular brand of cell phone has only three volume levels. The cell phone would need to know, when receiving a user preference, how to translate a volume setting (e.g., level 7, etc.) that is in terms of the user-specified levels (e.g., 1 through 10, etc.) to a volume setting that is in terms of the phone's levels (e.g., something out of 3, etc.). The cell phone would be provided with the number of user-specified levels (e.g., 10 levels, etc.) to enable the phone to translate the user's setting to an actual phone setting. In accordance with the illustrative embodiment of the present invention, the information that is transmitted from one terminal to another includes compatibility information (e.g., the number or range of volume levels, etc.). The compatibility information can be transmitted once, occasionally, or every time that the corresponding attribute setting is transmitted. It will be clear to those skilled in the art how the receiving terminal can use the compatibility information to translate the attribute settings that are received from the transmitting terminal. Furthermore, as those who are skilled in the art will appreciate, there can be other possible techniques to enable compatibility across terminals.

A third segment within user $U_m$'s profile is a call log. User $U_m$'s call log is a record of user $U_m$'s call activity (i.e., on the user-traffic communications channel) that consists of one or more call log entries, where each call log entry represents a call event. FIG. 6 depicts an example of an illustrative user profile segment (i.e., segment 412-3-2) that represents the call log of a particular user $U_3$, in accordance with the illustrative embodiment of the present invention. As will be appreciated by those skilled in the art, the information that is stored for the call log can be organized differently than what is depicted in FIG. 6. The illustrative call log is a record of call activity that comprises one or more of the following:

i. The calls that are made and completed to user $U_3$ (i.e., "incoming call events"), as stored in table 601;
ii. The calls that are originated by user $U_3$ (i.e., "outgoing call events"), as stored in table 602; and
iii. The calls that are made, but not completed, to user $U_3$ (i.e., "missed call events"), as stored in table 603.

The illustrative call log, as depicted in FIG. 6, illustrates a record that consists of call log entries that represent telephone call events. It will, however, be clear to those skilled in the art, after reading this disclosure, how to make and use a call log that provides a record of message activity, where the record of message activity is either integrated with or segregated from the record of telephone call activity. Examples of such messages include email messages, Short Message Service [SMS] messages, Multimedia Message Service [MMS] messages, Instant Messaging [IM] messages, and so forth. A call log that provides a record of message activity is also known as a "message log."

Call logs are described in additional detail in co-pending U.S. patent application Ser. No. 10/881,908 and U.S. patent application Ser. No. 10/899,662, both of which are incorporated herein by reference.

Figure 7:
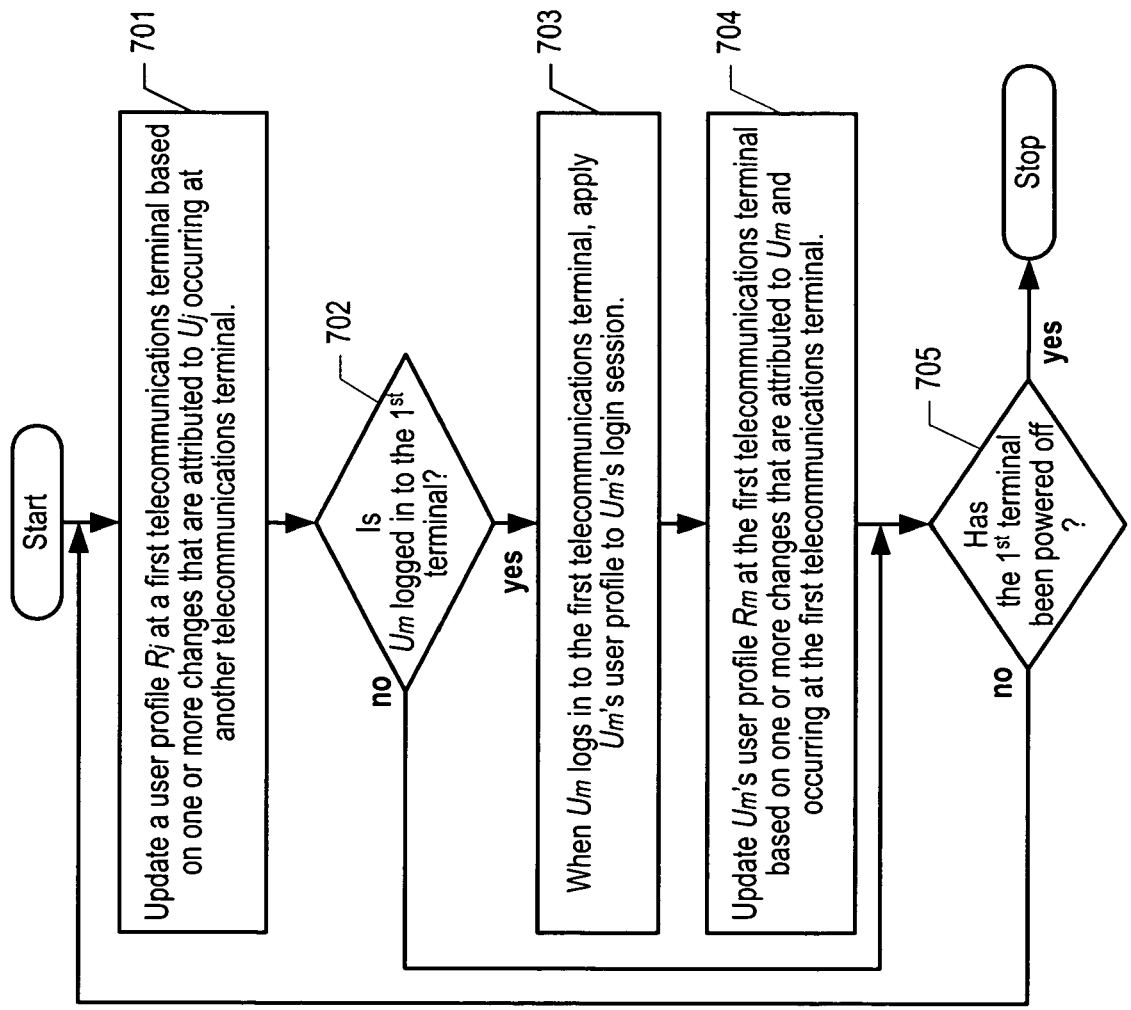
FIG. 7 depicts a flowchart of the salient tasks that are associated with updating one or more user profiles, in accordance with the illustrative embodiment of the present invention.

FIG. 7 depicts a flowchart of the salient tasks that are associated with updating one or more user profiles, in accordance with the illustrative embodiment of the present invention. It will be clear to those skilled in the art which tasks depicted in FIG. 7 can be performed simultaneously or in a different order than that depicted.

For clarity purposes, the tasks that are subsequently disclosed are described from the perspective of a first telecommunications terminal, namely terminal 201-1, executing the tasks and subtasks. It is also assumed that terminal 201-1 is in a device/user group, along with terminals 201-2 and 201-3 and users $U_1$ through $U_4$. As those who are skilled in the art will appreciate, each of terminals 201-2 and 201-3 is also executing the tasks described with respect to FIGS. 7 through 9. Therefore, synchronization-related messages that comprise portions of user profile information can arrive at terminal 201-1 asynchronously from the other terminals. Furthermore, some terminals might be unavailable to communicate with terminal 201-1 at any given point in time. For example, terminal 201-2 might be powered off or out of communications range with terminal 201-1. As those who are skilled in the art will appreciate, the fact that one or more terminals might not be in a state to communicate with terminal 201-1 does not affect terminal 201-1's ability to execute the described tasks.

At task 701, terminal 201-1 updates a user profile $R_j$ for user $U_j$, based on one or more changes that are attributed to user $U_j$ and that have occurred at another telecommunications terminal (e.g., terminal 201-2, 202-3, etc.). The subtasks that are associated with task 701 are described below and with respect to FIG. 8.

At task 702, terminal 201-1 checks to see if user $U_m$ is logged in (i.e., is in a login session on terminal 201-1). If so, task execution proceeds to task 703. If not, task execution proceeds to task 705.

At task 703, when user $U_m$ first logs in, terminal 201-1 applies $U_m$'s user profile (i.e., user profile $R_m$) to the login session. In other words, user $U_m$'s contact list, user preferences, and call logs are activated and available while user $U_m$ is logged in.

At task 704, terminal 201-1 updates user $U_m$'s profile (i.e., user profile $R_m$), based on one or more changes that are attributed to $U_m$ and that have occurred within terminal 201-1. The subtasks that are associated with task 704 are described below and with respect to FIG. 9.

At task 705, terminal 201-1 checks to see if it has been powered off (e.g., by the user pressing the "end/off" key, etc.). If so, task execution ends. If not, task execution proceeds back to task 701.

Figure 8:
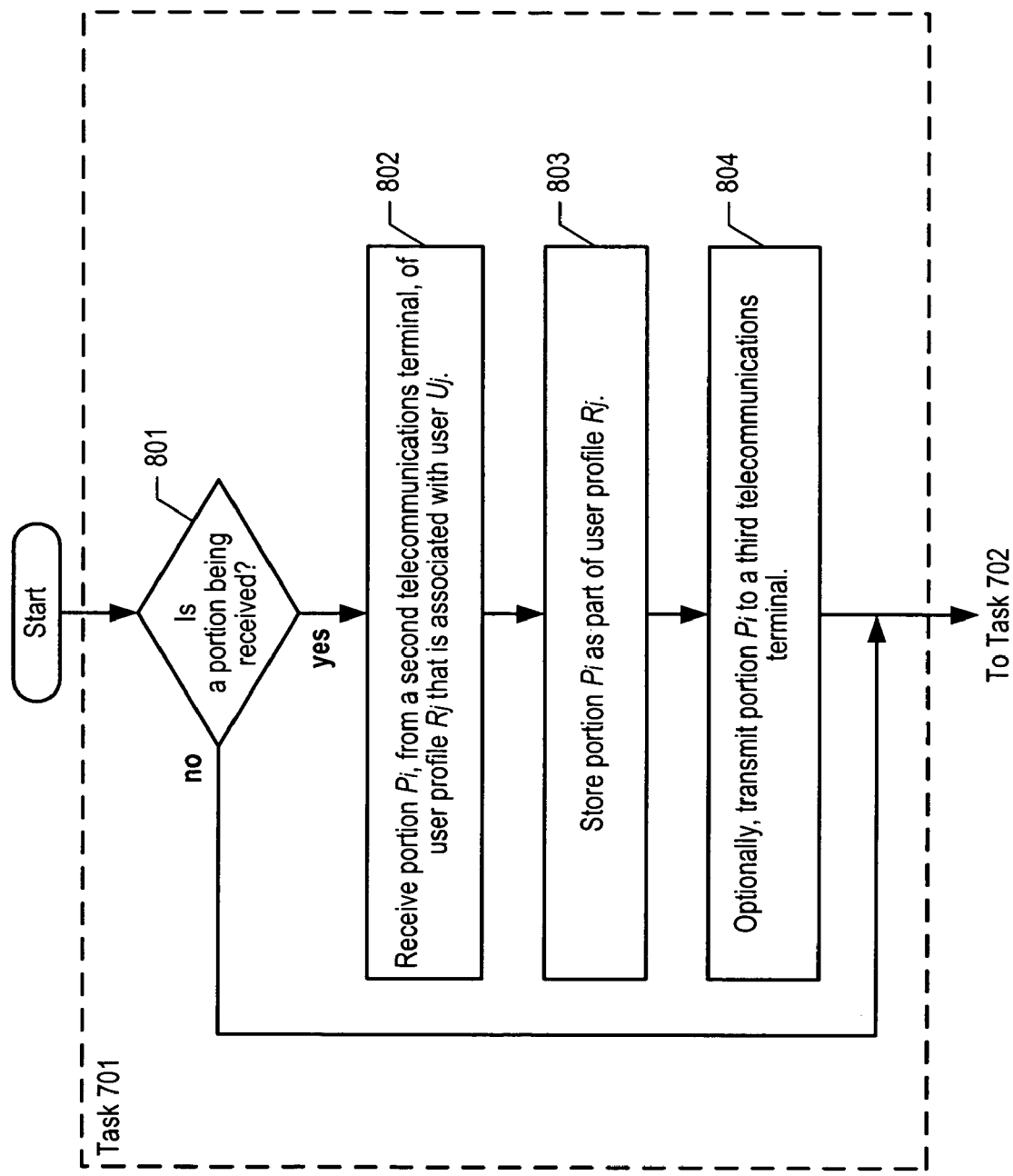
FIG. 8 depicts a flowchart of the salient tasks that are associated with updating one or more user profiles, based on changes that have occurred in terminals other than the present terminal, in accordance with the illustrative embodiment of the present invention.

FIG. 8 depicts a flowchart of the salient tasks that constitute task 701 and that are associated with updating one or more user profiles based on changes that have occurred in terminals other than terminal 201-1, in accordance with the illustrative embodiment of the present invention. It will be clear to those skilled in the art which tasks depicted in FIG. 8 can be performed simultaneously or in a different order than that depicted.

At task 801, terminal 201-1 checks to see if it is receiving a portion of a user profile. If so, task execution proceeds to task 802. If not, task execution proceeds to task 702.

At task 802, terminal 201-1 receives, from a second telecommunications terminal (e.g., terminal 201-2, etc.), portion $P_i$ of user profile $R_j$ that is associated with user $U_j$. For example, user $U_j$, who is logged in to terminal 201-2, might have just received a call on terminal 201-2. The incoming call updated user $U_j$'s call log stored in terminal 201-2 as part of user profile $R_j$. Terminal 201-2 then transmitted the updated portion of the call log over to terminal 201-1, which terminal 201-1 receives. As another example, another user $U_j$ might have just modified her user preferences on terminal 201-3. The modifying action updated user $U_j$'s user preferences stored in terminal 201-3 as part of user profile $R_j$. Terminal 201-3 then transmitted the updated portion of the user preferences over to terminal 201-1, which terminal 201-1 receives.

At task 803, terminal 201-1 stores portion $P_i$ into user $U_j$'s call log, as part of user profile $R_j$. For example, if portion $P_i$ represents a missed call entry, terminal 201-1 stores $P_i$ as part of the missed-calls events.

At task 804, terminal 201-1 optionally transmits portion $P_i$ to at least a third telecommunications terminal (e.g., terminal 201-3, etc.). The terminal or terminals that are to receive portion $P_i$ are selected from device/user group 401, wherein the addressing information needed to communicate with selected terminal 201-k is in terminal profile 411-k. This action provides a way to propagate the updates faster to the other terminals in the device/user group. As those who are skilled in the art will appreciate, telecommunications system 200 might be configured such that a terminal might be out of communications range with some terminals, but can use intermediary terminals to propagate the changed user profile information to those out-of-range terminals.

Task execution then proceeds to task 702.

Figure 9:
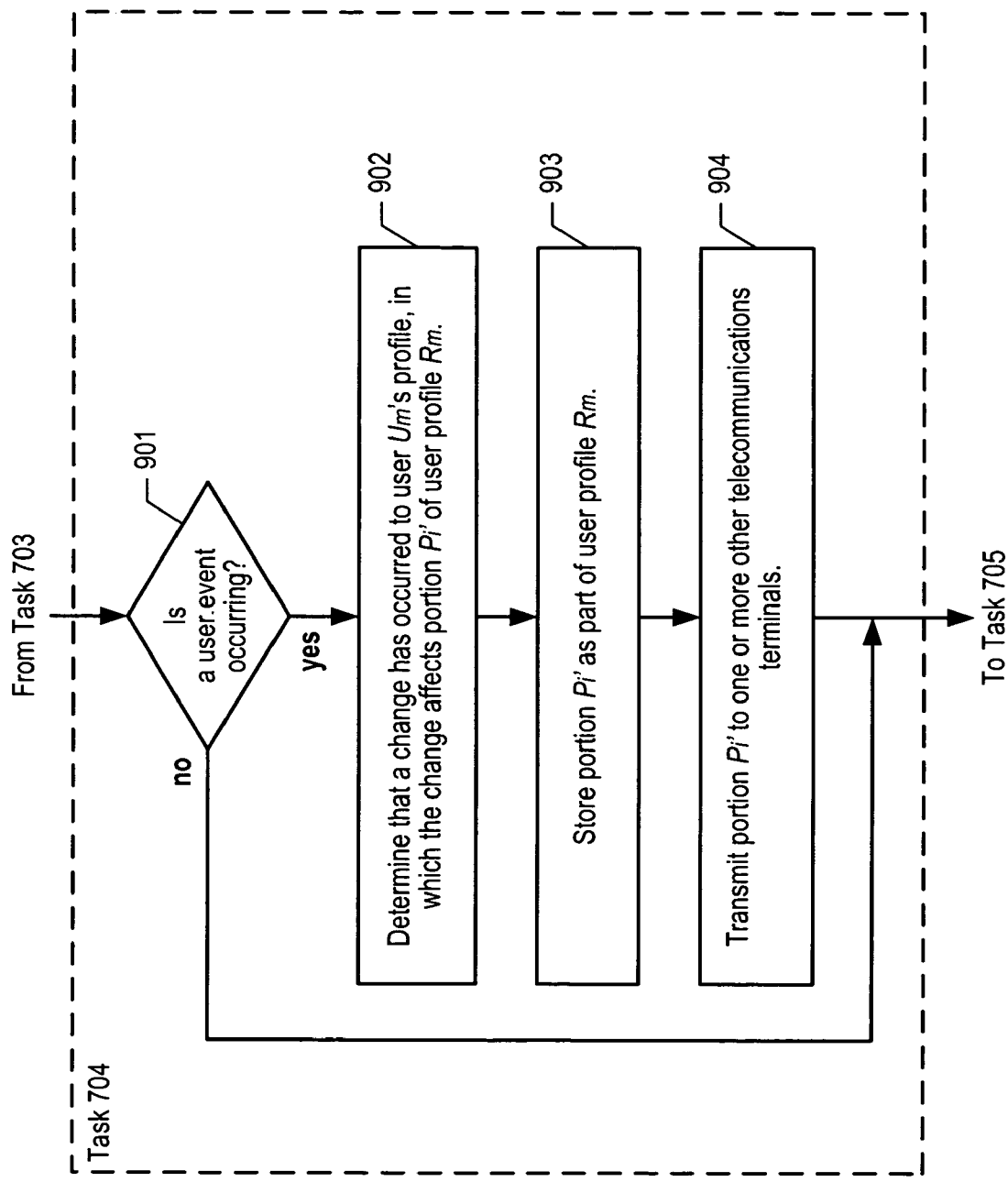
FIG. 9 depicts a flowchart of the salient tasks that are associated with updating user $U_m$'s profile (i.e., profile $R_m$), based on changes that have occurred in the present terminal, in accordance with the illustrative embodiment of the present invention.

FIG. 9 depicts a flowchart of the salient tasks that constitute task 704 and that are associated with updating user $U_m$'s profile (i.e., profile $R_m$), based on changes that have occurred in terminal 201-1, in accordance with the illustrative embodiment of the present invention. It will be clear to those skilled in the art which tasks depicted in FIG. 9 can be performed simultaneously or in a different order than that depicted.

At task 901, terminal 201-1 checks to see if an event is occurring that involves user $U_m$. For example, user $U_m$ might be updating his user preferences or contact list, or there might be call activity (i.e., incoming call, outgoing call, or missed call) that affects user $U_m$'s call log. If so, task execution proceeds to task 902. If not, task execution proceeds to task 705.

At task 902, terminal 201-1 determines that a change has occurred to user profile $R_m$ that affects portion $P_{i'}$ of profile $R_m$. It will be clear to those skilled in the art how to determine that a change has occurred.

At task 903, terminal 201-1 stores portion $P_{i'}$ into user $U_m$'s profile $R_m$. For example, if user $U_m$ selects a new ringtone for alerting purposes, the selection will be recorded in profile $R_m$.

At task 904, terminal 201-1 transmits portion $P_{i'}$ to one or more other telecommunications terminals (e.g., terminal 201-2, terminal 201-3, etc.). Terminal 201-1, in some embodiments, might transmit portion $P_{i'}$ only if the synchronization settings in user $U_m$'s profile $R_m$ indicate that synchronization is allowed for portion $P_{i'}$. The terminal or terminals that are to receive portion $P_{i'}$ are selected from device/user group 401, wherein the addressing information for selected terminal 201-k is in terminal profile 411-k.

In some embodiments, terminal 201-1 transmits portion $P_{i'}$, based on an amount of time having elapsed since an earlier transmission of a portion of user profile $R_m$. For example, terminal 201-1 might hold onto multiple portions before transmitting those portions. Terminal 201-1 might transmit those held portions periodically or sporadically. One purpose for holding (or buffering) multiple portions before transmitting is to optimize transmission efficiency across the synchronization communications channel.

In some alternative embodiments of the present invention, terminal 201-1 periodically or sporadically negotiates with each of terminal 201-2 and terminal 201-3 to synchronize bi-directionally one or more portions of user profile $R_m$ with each terminal. For example, user $U_m$ might have been logged onto terminal 201-2 immediately prior to logging onto terminal 201-1. As a result, changes related to user profile $R_m$ might have accumulated in both terminals 201-1 and 201-2, and would require synchronizing across both of the terminals, instead of just in one direction.

Note that after user $U_m$ logs off of terminal 201-1, a different user $U_{m'}$ might log onto terminal 201-1, as would be detected at task 702. Task 703 and the subtasks that constitute task 704 would then apply to user $U_{m'}$ and user profile $R_{m'}$.

It is to be understood that the above-described embodiments are merely illustrative of the present invention and that many variations of the above-described embodiments can be devised by those skilled in the art without departing from the scope of the invention. For example, in this Disclosure, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the disclosure to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Disclosure are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A first telecommunications terminal comprising:
   a receiver for receiving, from a second telecommunications terminal, a first portion of a first user profile that is associated with a first user, wherein the first portion comprises a first call log entry that is associated with the first user;
   a memory for storing:
      (i) the first portion as part of the first user profile,
      (ii) a second user profile that is associated with a second user, and
      (iii) identifiers for a predetermined group of terminals that comprises at least the first telecommunications terminal, the second telecommunications terminal, and a third telecommunications terminal; and
   a transmitter for transmitting a second portion of the second user profile to the third telecommunications terminal, wherein the transmitter transmits the second portion based on the third telecommunications terminal belonging to the predetermined group.

2. The telecommunications terminal of claim 1 further comprising a processor for determining that the second user profile has changed;
   wherein the transmitter transmits the second portion also based on the processor determining that the second user profile has changed.

3. The telecommunications terminal of claim 1 wherein the second portion comprises a second call log entry that is associated with the second user.

4. The telecommunications terminal of claim 1 wherein the second portion comprises a first user preference that is associated with the second user, wherein the first user preference specifies i) a volume level and ii) information for translating the volume level to an actual phone setting of volume.

5. The telecommunications terminal of claim 1 wherein the receiver is also for receiving, from the second telecommunications terminal, a third portion of a third user profile that is associated with a third user.

6. A method comprising:
   receiving, at a first telecommunications terminal:
      (i) a first portion, from a second telecommunications terminal, of a first user profile that is associated with a first user, wherein the first portion comprises a first call log entry that is associated with the first user, and
      (ii) a second portion of a second user profile that is associated with a second user; and
   storing, at the first telecommunications terminal:
      (i) the first portion as part of the first user profile,
      (ii) the second portion as part of the second user profile, and
      (iii) identifiers for a predetermined group of terminals that comprises at least the first telecommunications terminal and the second telecommunications terminal;
   wherein the receiving of the first portion is based on the second telecommunications terminal belonging to the predetermined group.

7. The method of claim 6 wherein the second portion comprises a second call log entry that is associated with the second user.

8. The method of claim 6 wherein the second portion comprises a first user preference that is associated with the second user, wherein the first user preference specifies i) a volume level and ii) information for translating the volume level to an actual phone setting of volume.

9. The method of claim 6 further comprising:
   determining, at the first telecommunications terminal, that a call event has occurred at the first telecommunications terminal, wherein the call event is attributed to a third user; and
   transmitting a third portion of a third user profile that is associated with the third user to a third telecommunications terminal, wherein the transmitting of the third portion is based on the determining of the call event as having occurred and on the third telecommunications terminal belonging to the predetermined group.

10. The method of claim 6 further comprising receiving, from the second telecommunications terminal, a third portion of a third user profile that is associated with a third user.

11. A method comprising:
    storing, at a first telecommunications terminal:
       (i) a first user profile that is associated with a first user,
       (ii) a second user profile that is associated with a second user, and
       (iii) identifiers for a predetermined group of terminals that comprises at least the first telecommunications terminal and a second telecommunications terminal; and
    transmitting, from the first telecommunications terminal:
       (i) a first portion of the first user profile to a second telecommunications terminal, and
       (ii) a second portion of the second user profile to the second telecommunications terminal;
    wherein the transmitting of the first portion and the second portion is based on the second telecommunications terminal belonging to the predetermined group.

12. The method of claim 11 wherein the first portion comprises a first call log entry that is associated with the first user, and wherein the second portion comprises a second call log entry that is associated with the second user.

13. The method of claim 11 wherein the second portion comprises a first user preference that is associated with the second user, wherein the first user preference specifies i) a volume level and ii) information for translating the volume level to an actual phone setting of volume.

14. The method of claim 11 further comprising determining, at the first telecommunications terminal, that a call event has occurred at the first telecommunications terminal, wherein the call event is attributed to the first user; and
wherein the transmitting of the first portion is also based on the determining of the call event as having occurred.

15. The method of claim 11 wherein the transmitting of the first portion is also based on an amount of time having elapsed since an earlier transmitting of a portion of the first user profile.

16. The method of claim 11 further comprising transmitting the second portion to a third telecommunications terminal, based on the third telecommunications terminal belonging to the predetermined group.

17. The method of claim 11 further comprising receiving, from the second telecommunications terminal, a third portion of a third user profile that is associated with a third user.

18. A method comprising:
receiving, at a first telecommunications terminal from a second telecommunications terminal, a first portion of a first user profile that is associated with a first user, wherein the first portion comprises a first call log entry that is associated with the first user;
storing, at the first telecommunications terminal:
(i) the first portion as part of the first user profile,
(ii) a second user profile that is associated with a second user, and
(iii) identifiers for a predetermined group of terminals that comprises the first telecommunications terminal, the second telecommunications terminal, and a third telecommunications terminal; and
transmitting a second portion of the second user profile from the first telecommunications terminal to the third telecommunications terminal, wherein the transmitting of the second portion to the third telecommunications terminal is based on the third telecommunications terminal belonging to the predetermined group.

19. The method of claim 18 wherein the transmitting of the second portion is also based on an amount of time having elapsed since an earlier transmitting of a portion of the second user profile.

20. The method of claim 18 wherein the second portion comprises a second call log entry that is associated with the second user.

21. The method of claim 18 wherein the second portion comprises a first user preference that is associated with the second user, wherein the first user preference specifies i) a volume level and ii) information for translating the volume level to an actual phone setting of volume.

22. The method of claim 18 further comprising:
determining, at the first telecommunications terminal, that a call event has occurred at the first telecommunications terminal, wherein the call event is attributed to the second user; and
wherein the transmitting of the second portion is also based on the determining of the call event as having occurred.

23. The method of claim 18 further comprising receiving, from the second telecommunications terminal, a third portion of a third user profile that is associated with a third user.

* * * * *

UNITED STATES PATENT AND TRADEMARK OFFICE
CERTIFICATE OF CORRECTION

PATENT NO. : 7,610,055 B2  Page 1 of 1
APPLICATION NO. : 11/128990
DATED : October 27, 2009
INVENTOR(S) : Erhart et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1202 days.

Signed and Sealed this

Twelfth Day of October, 2010

David J. Kappos
*Director of the United States Patent and Trademark Office*